(12) United States Patent
Fredley et al.

(10) Patent No.: US 7,150,929 B2
(45) Date of Patent: Dec. 19, 2006

(54) FUEL CELL COOLERS WITH INVERSE FLOW AND CONDENSATION ZONE

(75) Inventors: Robert R. Fredley, Tolland, CT (US); Bhimashankar V. Nitta, Ellington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 78 days.

(21) Appl. No.: 11/025,231

(22) Filed: Dec. 29, 2004

(65) Prior Publication Data

US 2006/0141312 A1 Jun. 29, 2006

(51) Int. Cl.
*H01M 8/04* (2006.01)

(52) U.S. Cl. .......................... 429/26; 429/39
(58) Field of Classification Search ................. 429/26, 429/34, 38, 39
See application file for complete search history.

(56) References Cited

U.S. PATENT DOCUMENTS

| | | | |
|---|---|---|---|
| 4,345,008 A * | 8/1982 | Breault | 429/26 |
| 6,322,915 B1 * | 11/2001 | Collins et al. | 429/26 X |
| 6,572,995 B1 * | 6/2003 | Yang et al. | 429/26 |
| 6,723,461 B1 * | 4/2004 | Gorman et al. | 429/26 |
| 2003/0215692 A1 * | 11/2003 | Rock et al. | 429/38 |

FOREIGN PATENT DOCUMENTS

WO    WO 00/36680    * 6/2000

* cited by examiner

*Primary Examiner*—Stephen J. Kalafut
(74) *Attorney, Agent, or Firm*—M. P. Williams

(57) ABSTRACT

A fuel cell system having a fuel cell stack (9) employing a phosphoric acid or other electrolyte, includes a non-reactive zone (11) in each of a group of fuel cells between corresponding coolant plates (55), the coolant entering the coolant plates in an area adjacent to the non-reactive zones (29–31). Each fuel cell has three-pass fuel flow fields, the first pass substantially adjacent to a third zone (13), remote from the first zone, the second pass substantially adjacent to a second zone contiguous with the first zone, the coolant flowing (33, 34) from a coolant inlet (29) through the first zone, to the far side of the second zone, and (37–41) from the near side of the second zone to the third zone and thence (45–50) to a coolant exit manifold (30), which assures temperatures above 150° C. (300° F.), to mitigate CO poisoning of the anode within the reactive zones, and assuring temperatures below 140° C. (280° F.) to promote sufficient condensation of evaporated electrolyte in the non-reactive zones, so as to provide a long system life.

5 Claims, 4 Drawing Sheets

FUEL CELL COOLERS WITH INVERSE FLOW AND CONDENSATION ZONE

TECHNICAL FIELD

This invention relates to a fuel cell power plant system which converts fuel to useable heat and electric power, employing a fuel cell stack which has fuel flow field and cooler planforms that promote a high degree of electrolyte condensation (which may be phosphoric acid in a fuel cell stack employing a phosphoric acid electrolyte, or may be a free acid electrolyte in a high temperature polymer electrolyte membrane (HTPEM) fuel cell stack) while maintaining a sufficiently high reaction temperature to mitigate CO poisoning of the catalysts.

BACKGROUND ART

In a known fuel cell system employing phosphoric acid electrolyte, cooler plates interposed between groups of fuel cells have a simple serpentine cooler flow path and utilize water coolant. Liquid water enters the cooler plates and a two-phase, water/steam mixture exits the cooler plates. A small fraction of the heat removal is due to increasing the sensible heat of the water as it increases to its boiling temperature, and a major fraction of heat removal is due to the latent heat of evaporation of liquid water to steam. U.S. Pat. No. 3,969,145 describes such a coolant system.

In any phosphoric acid fuel cell, the useful life of the fuel cell is determined principally by the rate at which phosphoric acid evaporates into the reactant gases and is not condensed back to a liquid before exiting the fuel cells. Non-reactive acid condensation zones at the reactant gas exits of the fuel cells minimize acid loss due to evaporation and thereby maximize life of the fuel cell stack. Such condensation zones are taught in U.S. Pat. Nos. 4,345,008 and 4,414,291, and in PCT patent publication WO 00/36680. The condensation zones should be below 140° C. (280° F.) in order to assure sufficient condensation of electrolyte so that the fuel cell stack will perform for at least ten years, which in turn requires that the coolant inlet temperature must be less than 140° C. (280° F.) in prior systems.

A competing problem in a phosphoric acid fuel cell stack is that the reformate fuel provided by a fuel processing system which converts various hydrocarbon fuels to hydrogen, such as a steam reforming fuel processor, contains between 0.3% and 1.0% carbon monoxide (CO), which is a poison to the anode catalyst and impedes the oxidation of hydrogen at the anode. The extent of poisoning is a function of the concentration of CO and cell temperature. At the likely concentrations of CO referred to hereinbefore, the temperature within the electrochemically active portion of each cell must be kept above 150° C. (300° F.) in order to provide reliable fuel cell performance. Thus, the temperature suited for condensation is lower than the temperature required for CO tolerance.

DISCLOSURE OF INVENTION

Objects of the invention include: providing for a high degree of liquid condensation in fuel cell stacks fueled by reformate containing carbon monoxide, without reducing cell performance as a result of carbon monoxide poisoning (CO); minimizing electrolyte loss in a phosphoric acid or high temperature polymer electrolyte membrane (HTPEM) fuel cell stack; maximizing the life of a phosphoric acid or HTPEM fuel cell stack; and achieving, in a phosphoric acid or HTPEM fuel cell, low temperatures required for condensing electrolyte which evaporates into the reactant gases, together with a higher temperature required to prevent CO poisoning of the anodes of the fuel cell stack.

According to the present invention, the planform of fuel cell electrode assemblies include a non-reactive zone which is maintained at a temperature sufficiently low so as to condense substantially all of the liquid which has evaporated into the reactant gas streams, allowing said liquid to re-migrate into the fuel cells. In accordance with the invention in one form, the electrolyte is phosphoric acid which is condensed in the non-reaction zone, but the invention may be used to condense electrolyte in HTPEM fuel cells.

According further to the invention, the coolant inlets are adjacent the non-reactive zones of the fuel cells, the resulting low temperatures promoting condensation of electrolyte which has evaporated into the reactant gases of the fuel cells. Coolant in a second zone, adjacent to the non-reactive zone, flows generally toward the non-reactive zone assuring the edge of the reactive zone adjacent to the non-reactive zone will be at a temperature high enough to mitigate CO poisoning of the catalysts. In one embodiment, the coolant thereafter flows generally away from said non-reactive zone. In one form, the invention may be incorporated in a fuel cell having a three-pass fuel flow field, the first fuel pass generally overlapping the third zone remote from the non-active zone, the second fuel pass being in a second zone, adjacent to the non-reactive zone, and the third fuel pass being within the non-reactive zone. In this form, the oxidant reactant gas enters the third zone, and flows through the second zone and the non-reactive zone to the oxidant reactant gas exit, which is adjacent to the coolant inlet. Other embodiments are disclosed hereinafter.

Although disclosed and primarily useful in a phosphoric acid fuel cells, the invention also may be used in other fuel cells containing free electrolyte to condense other electrolytes from the reactant gas exiting the fuel cell.

The invention may be used with a single phase coolant, such as water, or a two-phase coolant, such as a water/steam mixture.

Other objects, features and advantages of the present invention will become more apparent in light of the following detailed description of exemplary embodiments thereof, as illustrated in the accompanying drawing.

MODE(S) FOR CARRYING OUT THE INVENTION

Figure 1:
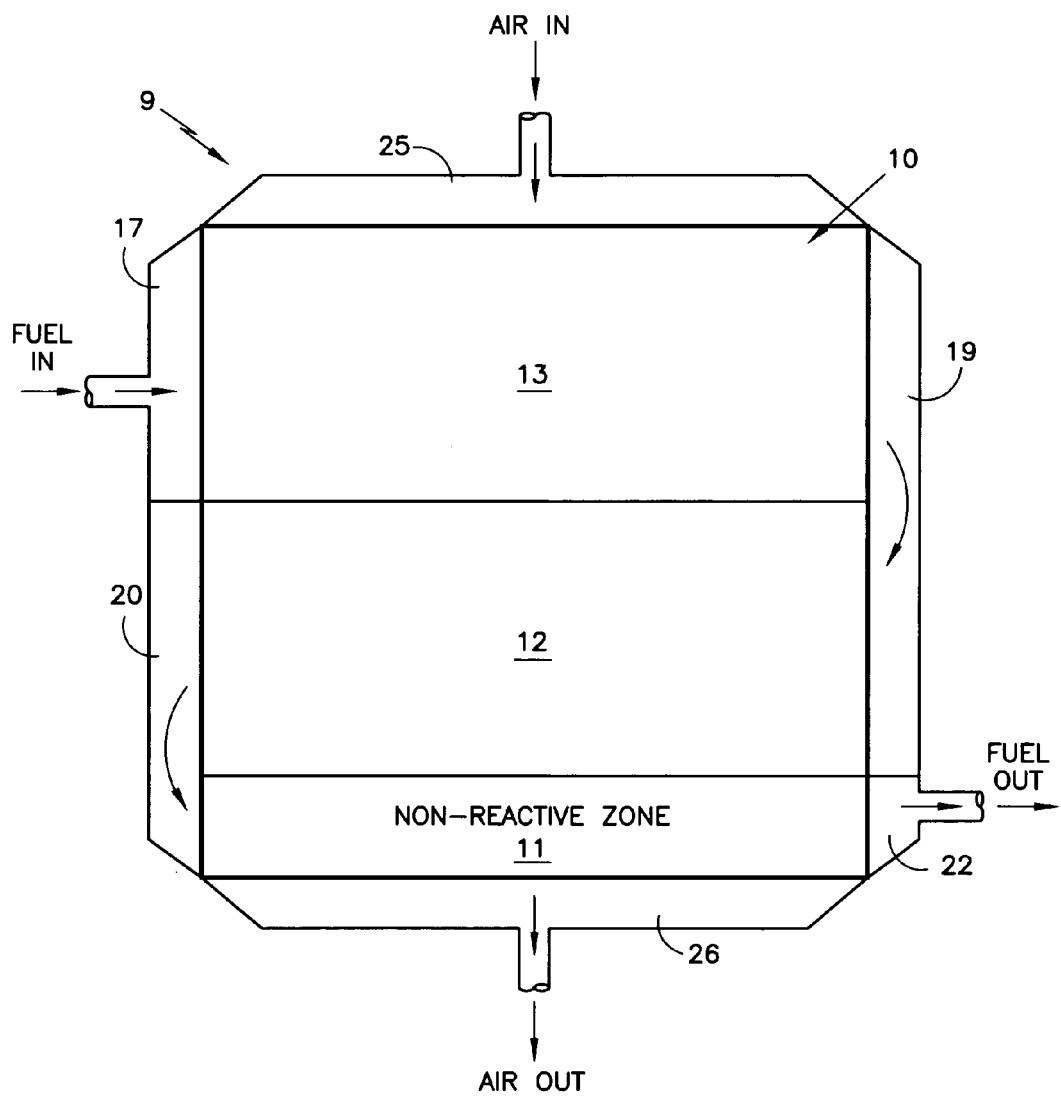
FIG. 1 is a simplified, stylized planform of the air and fuel flow fields of fuel cells employing the invention, indicating the non-reactive zone.

Referring to FIG. 1, a fuel cell stack 9, according to the invention, includes a plurality of fuel cells 10 having three zones 11–13. Each of the zones 11–13 generally overlaps one of three fuel flow passes in the fuel flow channels. Fuel enters through a fuel inlet manifold 17, and flows to the right (as seen in FIG. 1) through the fuel flow fields associated with the third zones 13. Then the fuel flows through a turnaround manifold 19 and then to the left (as seen in FIG. 1) through the fuel flow fields associated with the second zones 12, to a second turnaround manifold 20, and then to the right (as seen in FIG. 1) through the flow fields associated with the first, non-reactive zones 11, and outwardly through a fuel exit manifold 22.

The first zones 11 are non-reactive because the portion of each fuel cell comparable with the first zones 11 do not have a cathode catalyst and therefore do not react with the reactant gases.

In the embodiment herein, the oxidant reactant gas, such as air, flows into an air inlet manifold 25 and then flows downwardly (as seen in FIG. 1) through the oxidant reactant gas flow fields in the third zones 13, the second zones 12, and the first zones 11, and thence outwardly through an air outlet manifold 26.

Figure 2:
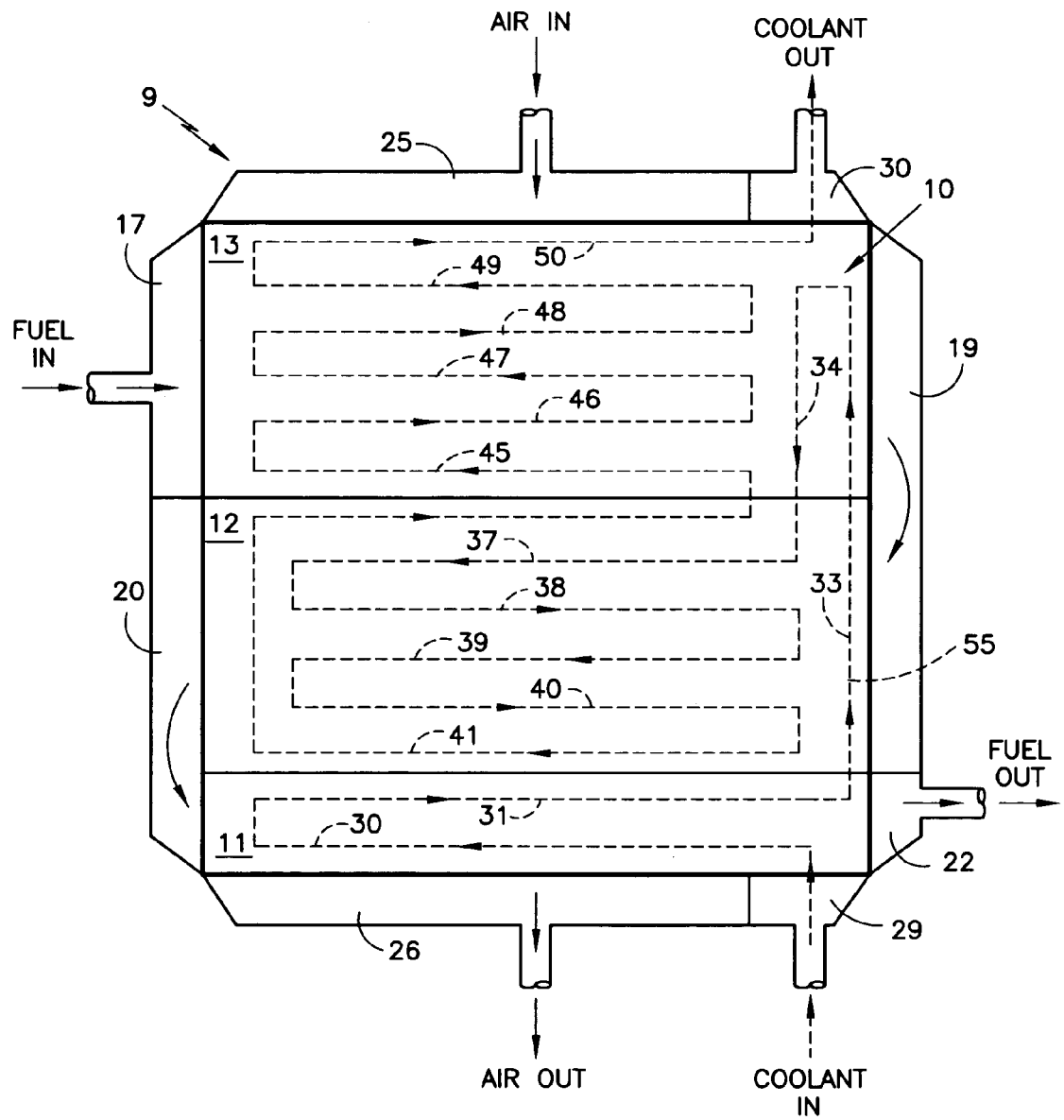
FIG. 2 is a planform as in FIG. 1, with the coolant flow channels illustrated thereon.

In FIG. 2, the fuel cell stack 9 planform configuration is shown as in FIG. 1, but in addition, includes the pattern of coolant flow channels in cooler plates, which typically are placed between groups of several fuel cells, throughout the fuel cell stack. For instance, in a 200 kW fuel cell system, there may be 35 coolers, placed between each group of eight fuel cells in a stack of 272 fuel cells. The cooler plates in this embodiment are fed by external coolant manifolds, including a coolant inlet manifold 29 and a coolant outlet manifold 30.

From the inlet manifold 29, the coolant flows adjacent the first, non-reactive zones 11 to the left and then the right through coolant flow channel segments 30, 31 respectively. Thus, the coolest coolant is provided adjacent non-reactive zones so as to cause significant condensation of electrolyte which may have evaporated into the reactant gases, as the reactant gases flow out of each of the fuel cells, without the cool temperature causing CO poisoning.

The coolant then flows through segments 33 of the coolant flow channels adjacent the first zones 11, the second zones 12 and the far side of the third zones 13. The coolant then flows through segments 34 of the coolant flow channels adjacent the third zones 13 and the second zones 12.

A "substack" is a group of cells between two cooler plates. The center cells within a substack are the hottest and the cells adjacent the coolers are the coolest. Acid loss is proportional to the local temperature at the exit of each pass of fuel or air. Extensions 33–34 lower the local temperature at the exit of the first fuel pass and thus reduce acid loss into the first fuel pass relative to a cooler plate design that does not have extensions 33–34. The fuel reactant of the several cells of a substack are well mixed together in fuel turn manifold 19. This results in all cells within the substack receiving a uniform quantity of acid. The hot cells receive less acid than they lost and the cold cells receive more acid than they lost.

The coolant then flows through serpentine flow segments 37–41 in a direction which is the same as the direction of the oxidant reactant gas, from top to bottom, as seen in FIG. 1, adjacent the second zones 12. This results in a reactive zone temperature adjacent to the non-reactive, condensation zones, that is above 150° C. (300° F.) which substantially reduces CO poisoning of the anode. Stated alternatively, the flows adjacent the first, non-reactive, condensation zones 11 and the flows adjacent the second zones 12 are such as to provide a sharp temperature gradient at the interface between the zones 11 and 12, so that the reactive portion of the fuel cell is well above 150° C. (300° F.) to avoid CO poisoning, while condensation will occur in the non-reactive zone at a temperature below 140° C. (280° F.).

The coolant then flows in a serpentine fashion through a plurality of segments 45–50 in a direction which is generally opposite to the flow of oxidant adjacent the third zones 13, to the coolant outlet manifold 30.

Figure 3:
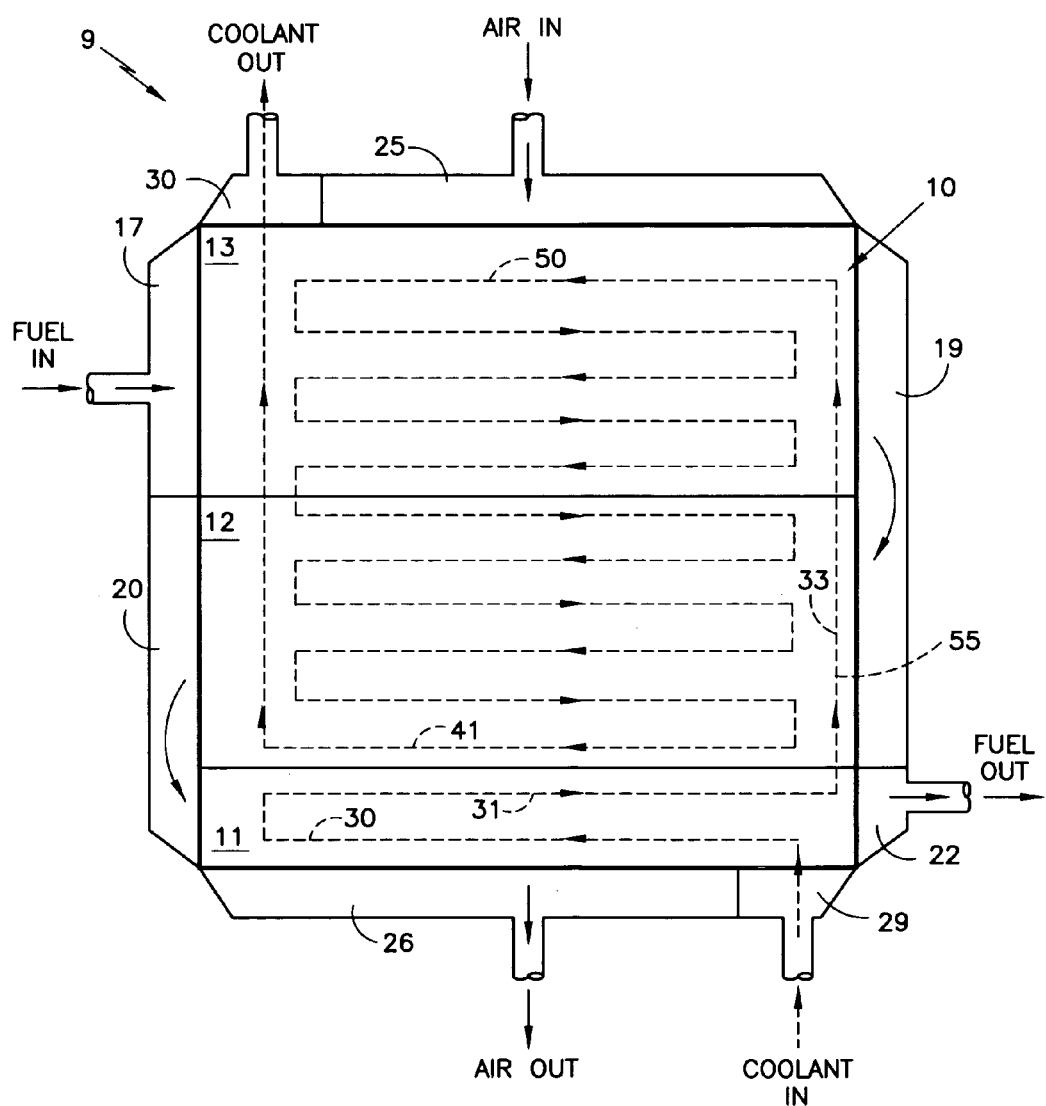
FIG. 3 is a variation of the planform in FIG. 2.

If desired, coolant flow channels may be established so that segment 33 joins directly with segment 50, as in FIG. 3, and coolant flow in the third zone 13 will be toward the first zone 11. The coolant exit manifold 30 may then be to the left of the air inlet manifold 25.

On the other hand, if desired, the invention may be practiced by having the segment 33 remain adjacent the second zones 12 and feed the segments 37 directly, thus eliminating the segments 34 and the extension of the segments 33 in the third zones.

Causing the cooler coolant to flow through the segments 37 first and the segments 41 last, in the second zones, overcomes the tendency of the cool flow in the segments 30, 31 of the first zone to cool the reactive zone, and particularly that portion of the second zones 12 which are adjacent to the first zones 11. This helps to provide a sharp temperature gradient between those portions of the fuel cells which are adjacent the segments 41 and those portions of the fuel cells which are adjacent to the segments 31, thus assuring a high enough temperature to avoid severe CO poisoning of the anodes adjacent the second zones and a low enough temperature for significant condensation of electrolyte adjacent the first zones 11.

Figure 4:
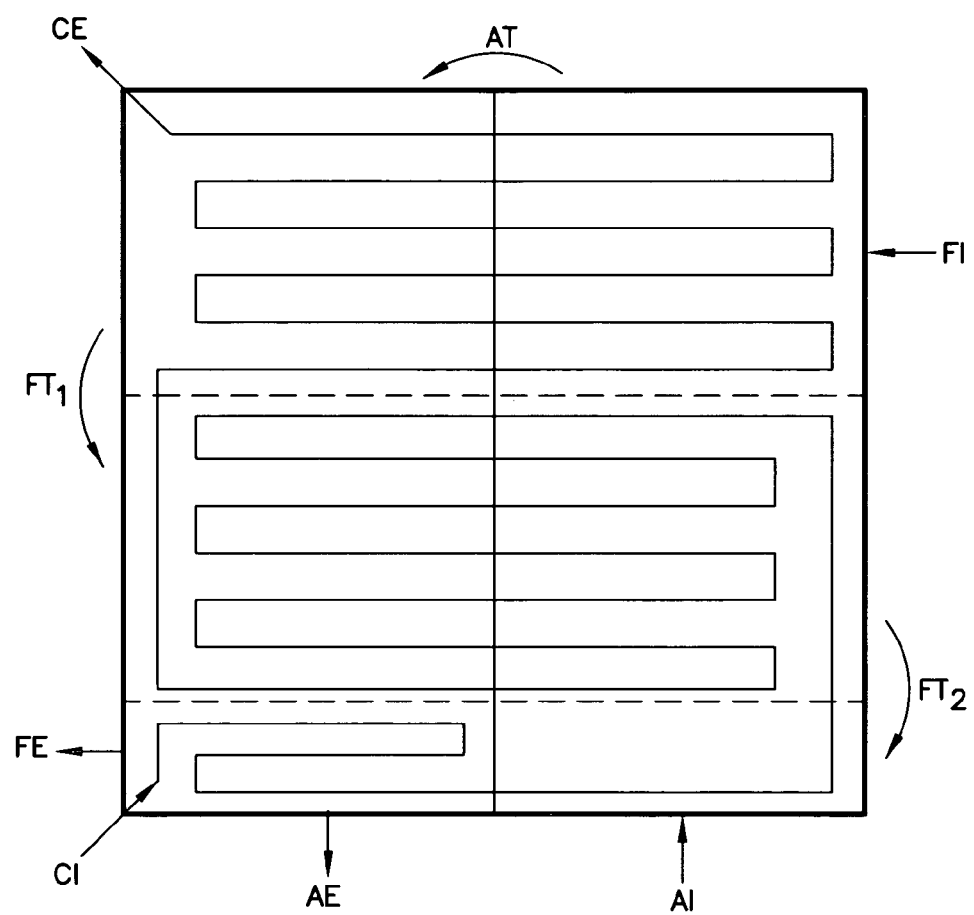
FIG. 4 is a simplified, stylized schematic diagram of a coolant flow field overlaid on a planform having a two-pass air flow field.

Two-pass air can be utilized with multiple pass fuel, as illustrated schematically in FIG. 4, wherein:

FI means fuel inlet,

FT1 means first fuel turn,

FT2 means second fuel turn,

A1 means air inlet,

AT means air turn,

AE means air exit,

CI means coolant inlet, and

CE means coolant exit.

Alternative fuel configurations consisting of more than three passes can be accommodated as long as the coolant enters the last fuel pass, flows generally counter to the oxidant flow in the last fuel pass, and passes through the next-to-last fuel pass (the fuel pass adjacent to the last fuel pass) in the same general direction as the oxidant flow in the next-to-last fuel pass.

There is an emerging technology of high temperature polymer electrolyte membranes. US 2004/0028976A1 describes a modified polybenzimidazole (PBI) membrane and US 2004/0127588A1 describes a polymer membrane based on polyazoles. Additional phosphoric acid or polyphosphoric acid, free acids, may be added to fuel cells which incorporate these high temperature polymer electrolyte membranes to enhance their electrochemical performance or to enhance their life. The invention may be used to condense such electrolytes as well as phosphoric acid.

The present invention may be used with single phase coolant, such as water, or with dual phase coolant, such as a water/steam mixture.

All of the aforementioned patents and patent publications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

The invention claimed is:

1. A fuel cell system, comprising:

a plurality of fuel cells interspersed with a plurality of cooler plates in a stack, each fuel cell having a fuel inlet, a fuel outlet, an oxidant inlet and an oxidant outlet;

each of said fuel cells having a reactive zone which is adjacent to both the fuel inlet and the oxidant inlet of the fuel cell and a non-reactive zone which is adjacent to both the fuel exit and oxidant exit of the fuel cell; and each of said cooler plates disposed adjacent at least one group of said fuel cells, each of said cooler plates having at least one coolant channel extending from a coolant inlet through a first zone, which generally overlaps at least a portion of said non-reactive zones of said fuel cells, to at least one additional zone, adjacent said first zone, which generally overlaps at least a portion of said reactive zones, the coolant channel in said additional zone flowing coolant in a direction which is from an edge of said additional zone remote from said first zone to an edge of said additional zone adjacent said first zone, thereby providing coolant in said additional zone which is warmest adjacent to said first zone.

2. A fuel cell system according to claim 1, wherein:

the planform of the anodes of said fuel cells each include a three-pass fuel reactant gas flow field, each pass substantially overlapping one of three coolant flow channel zones, including said first zone which substantially overlaps a third pass of said fuel flow fields, said additional zone which substantially overlaps a second pass of said fuel flow fields, and a third zone which substantially overlaps the first pass of said fuel flow fields.

3. A fuel system according to claim 2, wherein:

said fuel reactant gas flows from said first pass into a fuel turn manifold to reach said second pass, and said coolant flows from said first zone in first coolant channels adjacent said fuel turn manifold through said additional zone into said third zone and then in second coolant channels adjacent said first coolant channels back to said additional zone.

4. A fuel cell system according to claim 1, wherein:

the planform of the anodes of said fuel cells each include a three-pass fuel reactant gas flow field, said non-reactive zone substantially overlapping a third pass of said fuel flow fields, said additional zone substantially overlapping the first pass and the second pass of said fuel flow fields.

5. A fuel cell system according to claim 1, wherein:

the planform of the fuel cells each include a two-pass oxidant reactant gas flow field, and said non-reactive zone substantially overlaps a portion of the second air pass which is adjacent to the fuel exit.

* * * * *